United States Patent
Dyakin et al.

(10) Patent No.: US 11,029,662 B2
(45) Date of Patent: Jun. 8, 2021

(54) SYSTEM AND METHOD FOR ENABLING DATA TO BE TRANSMITTED BETWEEN PROGRAM MODULES BASED ON COMPLIANCE WITH RULES

(71) Applicant: AO Kaspersky Lab, Moscow (RU)

(72) Inventors: Pavel V. Dyakin, Moscow (RU); Dmitry A. Kulagin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 16/799,313

(22) Filed: Feb. 24, 2020

(65) Prior Publication Data

US 2020/0192321 A1 Jun. 18, 2020

Related U.S. Application Data

(63) Continuation of application No. 15/715,258, filed on Sep. 26, 2017, now Pat. No. 10,599,120.

(30) Foreign Application Priority Data

Feb. 8, 2017 (RU) ............................ RU2017104131

(51) Int. Cl.
*G06F 21/44* (2013.01)
*G05B 19/05* (2006.01)
*G05B 19/4063* (2006.01)

(52) U.S. Cl.
CPC ....... *G05B 19/058* (2013.01); *G05B 19/4063* (2013.01); *G05B 19/056* (2013.01); *G05B 2219/13142* (2013.01); *G05B 2219/15115* (2013.01)

(58) Field of Classification Search
CPC .............. G05B 19/058; G05B 19/4063; G05B 2219/13142; G06F 21/126; G06F 21/00; G06F 21/50; G06F 21/52; G06F 21/76
See application file for complete search history.

(56) References Cited

U.S. PATENT DOCUMENTS 10,375,106 B1 * 8/2019 Roesler ............... H04L 63/1433
2017/0099322 A1 * 4/2017 Keini .................. H04L 63/0263

* cited by examiner

Primary Examiner — Olugbenga O Idowu
(74) Attorney, Agent, or Firm — Michael Fainberg; Arent Fox LLP

(57) ABSTRACT

Disclosed systems and methods for enabling data to be transmitted between program modules based on compliance with rules, the method comprising: monitoring, by a security module executable by a processor, an interaction between a first program module and a second program module to determine whether the interaction complies with at least one rule, wherein the first program module is a source of data being exchanged with the second program module which is a recipient of the data, when the interaction does not comply with the at least one rule, modifying the data being exchanged between the source and the recipient of the data, and when the interaction complies with the at least one rule, allowing the data to be transmitted to the recipient.

21 Claims, 7 Drawing Sheets

SYSTEM AND METHOD FOR ENABLING DATA TO BE TRANSMITTED BETWEEN PROGRAM MODULES BASED ON COMPLIANCE WITH RULES

CROSS-REFERENCE TO RELATED APPLICATIONS

This application is a continuation of U.S. application Ser. No. 15/715,258 filed on Sep. 26, 2017, which claims the benefit of priority under 35 U.S.C. 119(a)-(d) to a Russian Application No. 2017104131 filed on Feb. 8, 2017, which are incorporated by reference herein in their entirety.

FIELD OF TECHNOLOGY

The present disclosure relates generally to the field of cybersecurity, and more specifically to systems and methods for enabling data to be transmitted between program modules bases on compliance with rules.

BACKGROUND

Cyberattacks on automated control systems (ACS) have become very common. Nearly all ACS elements are subject to attacks, and the programmable logic controllers (PLCs) are no exception. The PLCs contain a number of vulnerabilities which can be utilized for an attack on the ACS. One such vulnerability is the use of execution systems of the PLC (such as CodeSYS RTE), which are composed of a monolithic or multicomponent program which is executed in a virtual address space on the operating system under whose control the PLC is working. Thus, if even one functional component supported by the PLC execution system is compromised, such as the one realizing the interaction with the input devices, the entire PLC execution system will be compromised.

The technical problem consists in the difficulty of providing a secure operation of the ACS containing the PLC execution system whose functional components contain vulnerabilities.

Currently, there are two different approaches to ensuring security of ACS: in the first case, the PLC design is developed to execute a strictly deterministic problem, which in theory rules out any flexibility (e.g., the ability to switch from one kind of production to another with minimal time and labor expense) and there is no need to make use of execution systems in their classical understanding. In the second case, PLCs are used together with execution systems, which lends maximum flexibility to the PLC, yet totally ignores the question of information security, even though very close attention is paid to the requirements for functional safety in view of their normative regulation.

SUMMARY

Disclosed are systems and methods systems and methods for enabling data to be transmitted between program modules bases on compliance with rules. One technical result of the disclose solutions is achieved by monitoring via a security module the interaction of the PLC execution system modules with each other and with the operating system, which is implemented by dividing the PLC execution system into modules and modifying the data exchange interface of the modules with each other and with the resources of the operating system so that the interaction is routed through the security module. Another technical result of the disclosed solutions consists in improving the functional safety of the ACS by dividing the execution system into modules and isolating them, where segments of code and data controlling critical objects are segregated in one module, while segments of code containing vulnerabilities are in another. As a result of the realization of a vulnerability in one module, a criminal cannot compromise another module, since the modules are separate and isolated, and the interaction between them is monitored.

In one aspect, a method is provided for enabling data to be transmitted between program modules bases on compliance with rules, the method comprising: monitoring, by a security module executable by a processor, an interaction between a first program module and a second program module to determine whether the interaction complies with at least one rule, wherein the first program module is a source of data being exchanged with the second program module which is a recipient of the data, when the interaction does not comply with the at least one rule, modifying the data being exchanged between the source and the recipient of the data, and when the interaction complies with the at least one rule, allowing the data to be transmitted to the recipient.

In one aspect, a system is provided for enabling data to be transmitted between program modules based on compliance with rules, the system comprising: a hardware processor executing a security module configured to: monitor an interaction between a first program module and a second program module to determine whether the interaction complies with at least one rule, wherein the first program module is a source of data being exchanged with the second program module which is a recipient of the data, when the interaction does not comply with the at least one rule, modify the data being exchanged between the source and the recipient of the data, and when the interaction complies with the at least one rule, allow the data to be transmitted to the recipient.

In one aspect, a non-transitory computer readable medium storing thereon computer executable instructions for enabling data to be transmitted between program modules based on compliance with rules, including instructions for monitoring an interaction between a first program module and a second program module to determine whether the interaction complies with at least one rule, wherein the first program module is a source of data being exchanged with the second program module which is a recipient of the data, when the interaction does not comply with the at least one rule, modifying the data being exchanged between the source and the recipient of the data, and when the interaction complies with the at least one rule, allowing the data to be transmitted to the recipient.

In one aspect, the at least one rule comprises one or more of: a primary rule, an optional rule, and a subsidiary rule.

In one aspect, the primary rule is used for all interactions, the optional rule is used when the primary rule evokes verification of compliance with the optional rule, and the subsidiary rule is used when neither the primary rule nor the optional rule are applicable.

In one aspect, the subsidiary rule comprises: a rule for halting the interaction between the source and recipient program modules.

In one aspect, the first program module comprises a communication module responsible for an interaction with a human-machine interface, the second program module comprises a core module responsible for running a Programming Logic Controller (PLC) program that sends commands to physical equipment, an interface is provided such that the interface supports a set of commands being transmitted between the first program module and the second program module, and the security module controls every command sent from the first program module to the second program module.

In one aspect, the control of commands sent from the first program module to the second program module is performed in accordance with a set of modes of operation, with each mode of operation of the set of modes of operation being associated with a respective list of permitted commands, and wherein the set of modes of operation include at least one of: a Normal Operation mode, a Maintenance mode, and an Audit mode.

In one aspect, the set of commands for a given mode of operation comprises at least one of: a Read Audit Log command, a Download File command, a Stop PLC Program command, and a PLC Program Update command.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for enabling data to be transmitted between program modules bases on compliance with rules. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
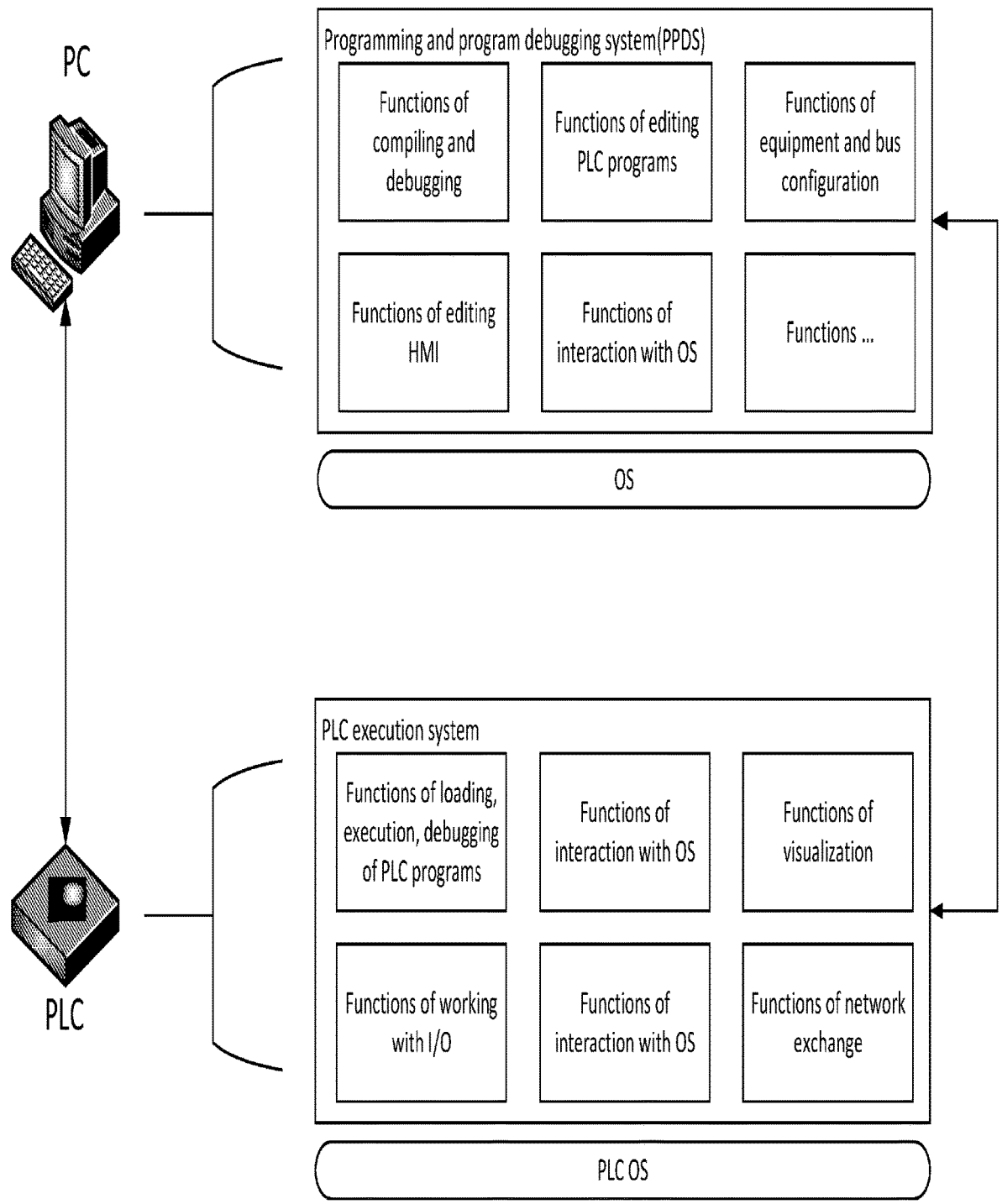
FIG. 1 illustrates an example of architecture of the PLC execution systems and a programming and program debugging system (PPDS)

FIG. 1 illustrates an example of architecture of the execution systems a programmable logic controller (PLC) and its programming and program debugging system (PPDS).

A programmable logic controller (PLC) is an electronic component of an industrial controller, a specialized (computerized) device used for the automation of technological processes. The execution system (execution runtime, runtime environment) is the software and/or hardware environment needed to execute the computer program and accessible during the execution of the computer program. It is also known as the implementation system, the implementation environment, the execution environment, or the execution system.

The execution system of a programmable logic controller (control runtime system) is a program environment installed on a PLC which is necessary to execute a control (application) program and which is accessible to the control program during the execution. It enables the loading and execution of the application program of the PLC and debugging functions. It is installed in the controller in the course of its manufacture. It is a monolithic (single-component) program or a program complex (consisting of several components). In the case of a monolithic program, all functionally complete code (i.e., program code in its different forms: object code, byte code (intermediate code), executable code, machine code) and program data segments responsible for network exchange, access to the I/O devices, and other functions are housed within one component; in another case, they are divided among several components (such as libraries). Examples of these systems are the MasterPLC execution system and the CodeSys Runtime execution system.

Functionally complete code and data segments realizing functions of network exchange, access to I/O devices, and other functions housed within a single program shall be called hereinafter A Functions, B Functions and C Functions, where for example "A Function" means a functionally complete segment of code and data responsible for the realization of the "A Function". A functional component should be distinguished from a program component. A functional component is an element of the functional structure, while a program component is an element of a program complex.

A component of the execution system is a set of functionally complete code and data segments combined into a program (e.g., application, library), a function, a functional block, from which the execution system is constructed hierarchically. The components interact with each other via an interface. In the context of the present disclosure, a module of an execution system is a particular case of a component which is executed separately from other components of the PLC execution system (e.g., in a different address space).

The totality of interrelated components (modules) from which the execution system is built hierarchically realizes the functional structure (the functions carried out by the execution system). The sequence and format of interaction of the interrelated components are determined by the functional logic. In a particular case, the realized functional structure and the functional logic (the method of interaction of the elements of the functional structure) are realized in the code of the business logic execution environment. The method of interaction in a particular case determines the sequence and format of interaction of the elements.

The business logic of the execution system is a set of rules, principles, and relations of the behavior of objects in the subject domain that is realized in the code of classes, methods, procedures and functions of the execution environment. An element of the business logic of the execution environment is a functionally complete set of instructions, classes, methods, procedures and functions. The set of elements forms the functional structure of the execution system or a portion thereof.

The business logic of the PLC execution system is a set of rules, principles, and relations of the behavior of objects in the technological process being automated that is realized in the code of classes, methods, procedures and functions of the execution environment. For example, the sequence of a network exchange, access to the I/O devices, interaction with the PLC OS.

In one exemplary aspect, the programming and program debugging system (PPDS) may be connected to the PLC execution system. The PPDS enables the loading of the application program into the memory of the PLC and transfer under the control of the PLC execution system. An example of a PPDS is shown in FIG. 1. In one exemplary aspect, the PPDS can be used to control the PLC execution system, change its configuration, and install additional modules on the PLC. In one exemplary aspect, the PPDS may be implemented in the processor of a general-purpose computer (such as that shown in FIG. 6).

As noted in the Background Section, PLC execution systems have problems with security because the PLC execution system constitutes a monolithic program or it consists of components which are executed in the same process. The present invention makes it possible to divide the execution system into modules, which makes it possible to monitor the interaction of any given elements of the functional structure of the PLC execution system or any given code segments of the execution system with each other and with the resources of the operating system. The present invention, when used with other execution systems, monolithic programs or multicomponent programs being executed in the same process, also is able to: increase the security of the computer systems on which those objects are functioning (being executed); and provide a monitoring of the interaction of the elements of these objects.

The invention is applicable not only to execution programs or systems as a whole, but also to any monolithic parts and components of programs and program complexes whose execution needs to be monitored, and also increase the security of the computer systems on which those parts or components are being executed. It should therefore be noted that all that is said for the PLC execution system is equally true, unless otherwise explicitly stated, or otherwise dictated by the nature of the PLC execution system emerging from the characteristics of the PLC, for: other execution systems, their parts and individual components (modules); monolithic programs and their parts; and multicomponent programs being executed in the same address space and individual components (modules) of these programs.

Figure 2:
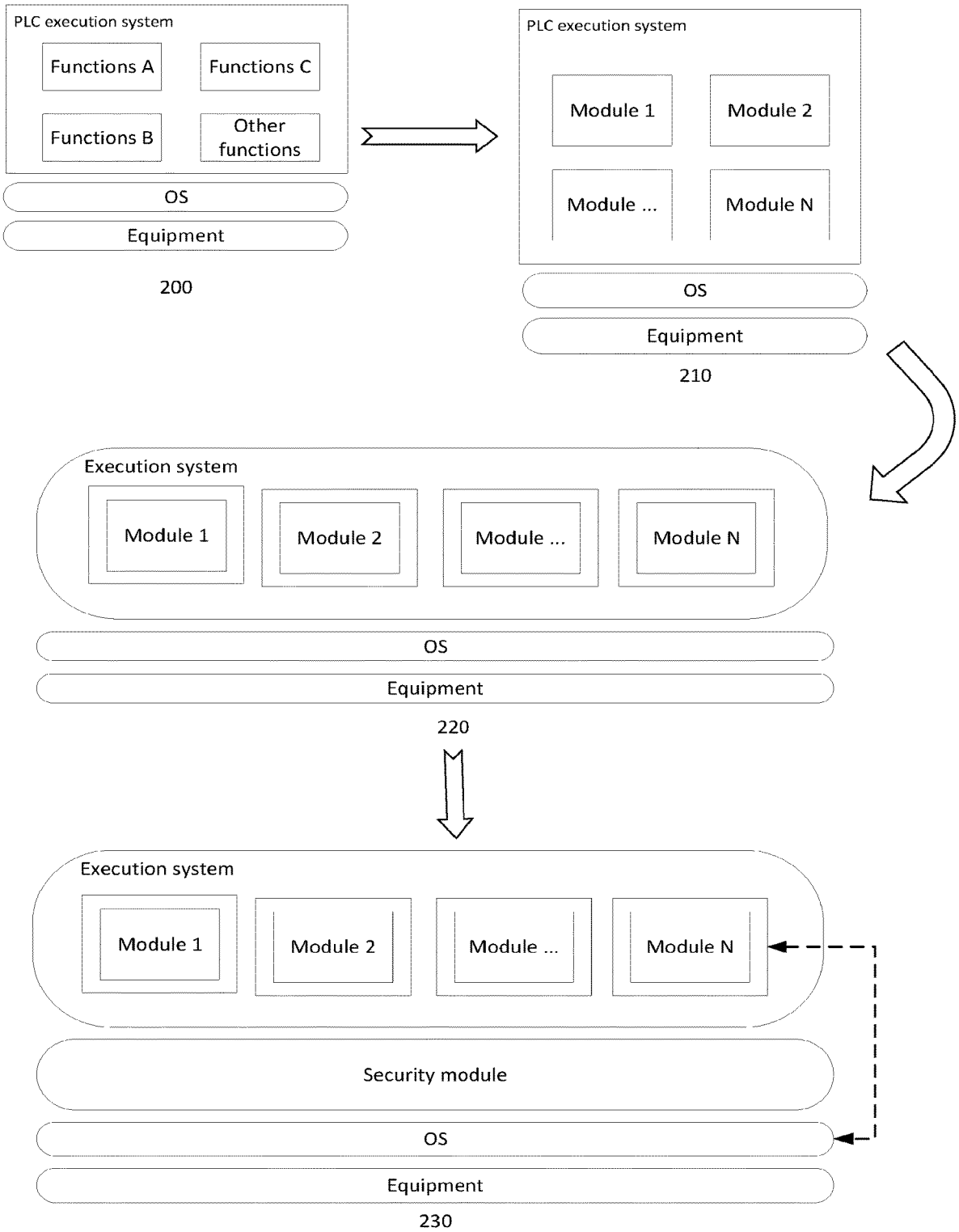
FIG. 2 illustrates an exemplary system and method for monitoring the PLC execution system.

FIG. 2 illustrates an exemplary system and method for monitoring the PLC execution system. In step 200, the PLC execution system is accessed by a security module, which in one exemplary aspect may be implemented as a security application installed on the PLC. Generally, the security module provide monitoring for the execution of the PLC execution system. More detailed explanation of the operation of the security module will be provided below. The PLC execution system is either extracted from the PLC or obtained prior to installation on the PLC. Alternatively, the method may be performed directly on the PLC.

Figure 3A:
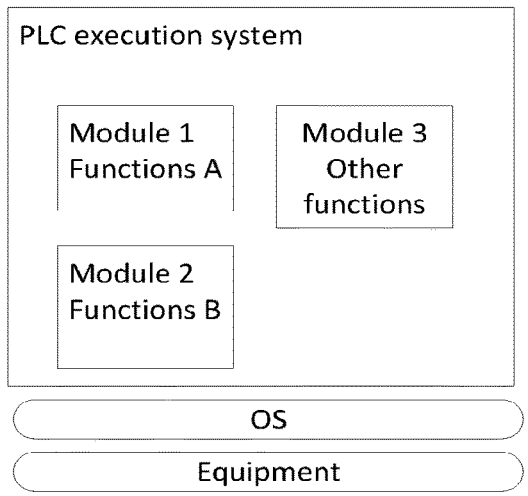
FIGS. 3A, 3B, 3C illustrate examples of the division of the PLC execution system into modules.

Next, in step 210, the code and data of the PLC execution system are divided, by the security module, into individual program modules base on, for example, of the functional structure of the PLC execution system. During this division process, a functionally complete code and data segment of the PLC execution system is segregated into at least one program module, while the rest of the code and data of the PLC execution system is segregated into another module. FIG. 3a shows an example of such a division, where the code and data segment intended for the execution of the "A functions" is segregated into "module 1", the code and data segment intended for the execution of the "B functions" are segregated into "module 2", and the code and data segment intended for the execution of the remaining "other functions" are segregated into "module 3".

Figure 3B:
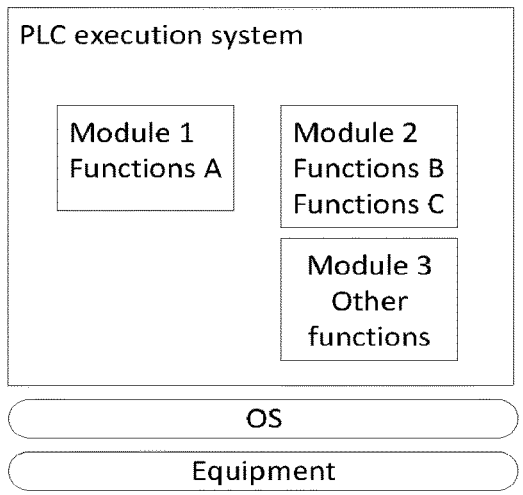

In another exemplary aspect, the code and data of the PLC system may be divided up on the basis of the security threats to the PLC execution system. In such a division process, one code and data segment of the execution system containing a vulnerability (or a vulnerable code segment, such as a segment responsible for the network interaction, which is generally the first target of an attack) that is used to realize the threats is segregated into at least one module, the rest of the code and data of the execution system being segregated into another module. FIG. 3b shows such divisions, for example the code and data segments intended for the execution of the A, B, C functions contain vulnerabilities, the code and data segment intended for the execution of the "A functions" is segregated into "module 1", the code and data segments intended for the execution of the "B functions" and "C functions" are segregated into "module 2", the code and data segments intended for the execution of the remaining "other functions" and not containing vulnerabilities are segregated into "module 3".

Figure 3C:
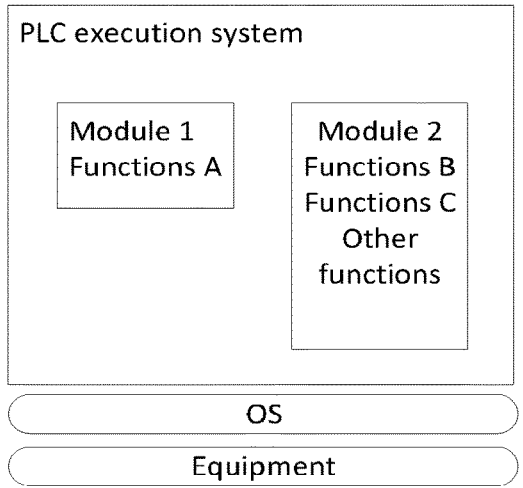

Yet in another exemplary aspect, the division process can also be based on the criticality of the code and data segments of the execution system, where the code and data segment of the PLC execution system which controls a critical object (a critical code and data segment) is segregated into at least one module, the rest of the code and data of the PLC execution system being segregated into another module. Generally, critical objects are those objects whose interruption in the execution may cause significant damage to the system on which it runs or other systems or objects, such as a system crash or the like. FIG. 3c shows an example of such a division, where the code and data segment intended for the execution of the "A functions" is critical code and contains critical data, that segment is segregated into module 1, the code and data segments intended for the execution of the remaining "B functions", "C functions" and "other functions" are segregated into "module 2".

In various aspects, these division criteria can be used either separately or jointly, in the example shown in FIG. 3b a division is used not only in terms of the presence of vulnerabilities but also based on the functional structure of the PLC execution system, while in the example shown in FIG. 3c a division is used not only in terms of criticality of the code/data, but also based on the functional structure of the PLC execution system.

FIG. 3b and FIG. 3c show examples where functionally complete code and data segments containing vulnerabilities or used for control of critical objects are segregated into modules; in the general case, for a division based on criticality and security threats it is not necessary to segregate functionally complete segments into a module; any given critical segments, or segments containing vulnerabilities, can be segregated. Examples are shown for ease of comprehension.

When segregating the code segments into modules, the method of interaction (the data exchange sequence and the data format) between the modules is organized equivalent to the method of interaction of these segments in the PLC execution system before the division. In other words, howsoever a given code segment interacted with a given segment and in what sequence, so too will the modules containing those code segments interact after the division of the PLC execution system.

Figure 4A:
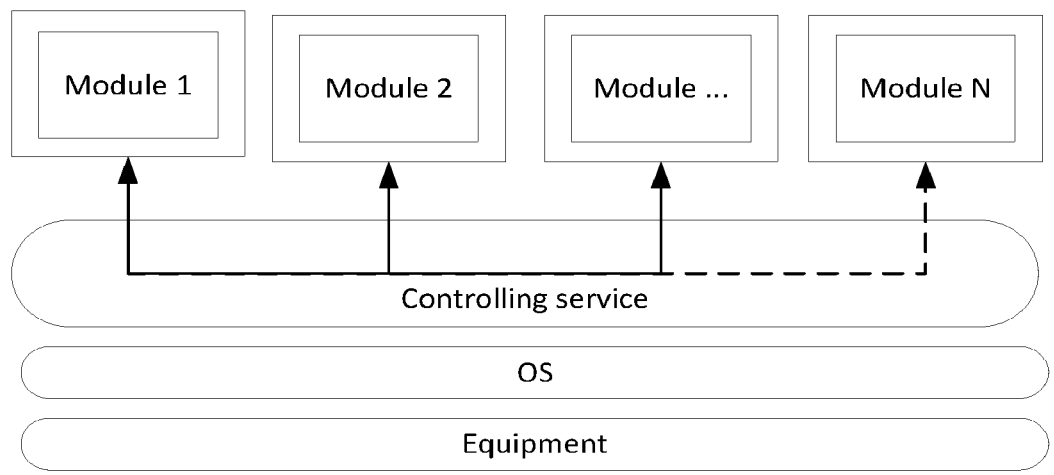
FIGS. 4A, 4B, 4C, 4D illustrate examples of the isolation of the modules of the PLC execution system.
Figure 4B:
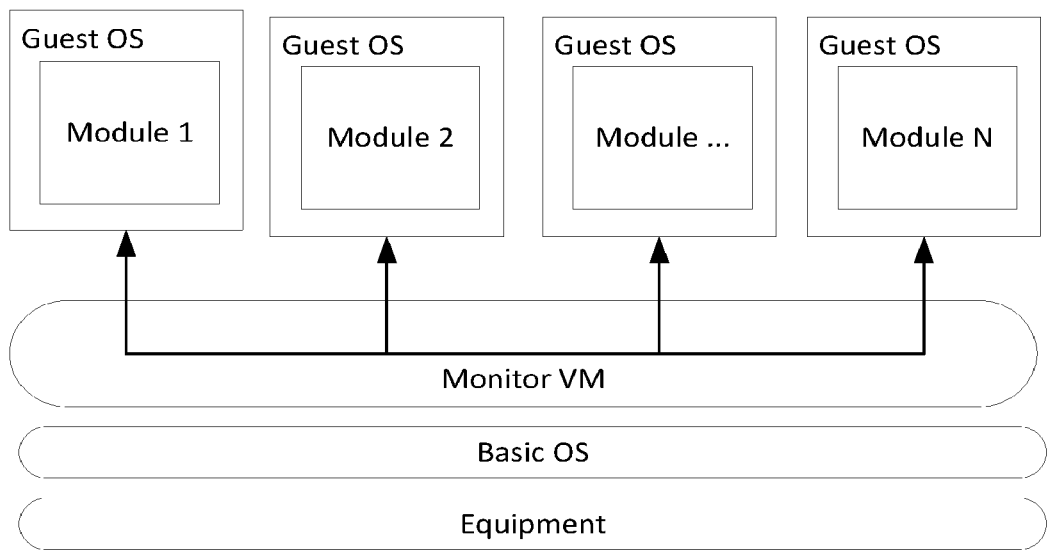
Figure 4C:
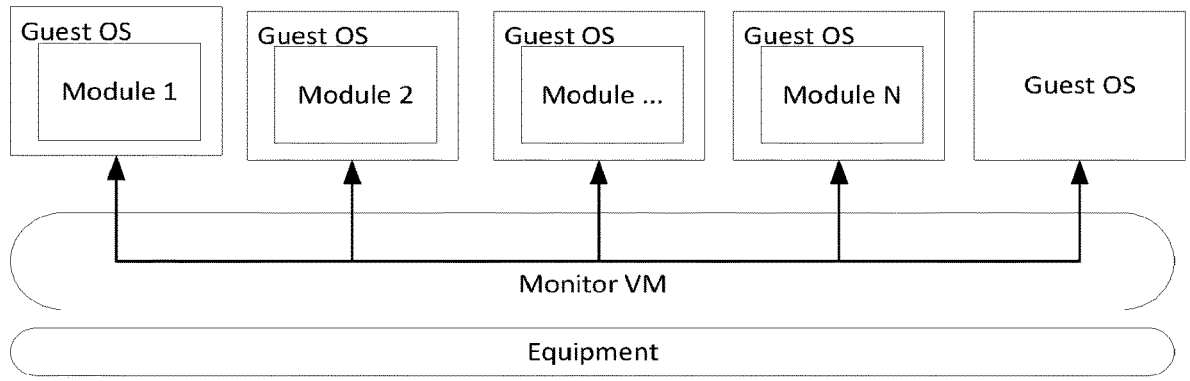
Figure 4D:
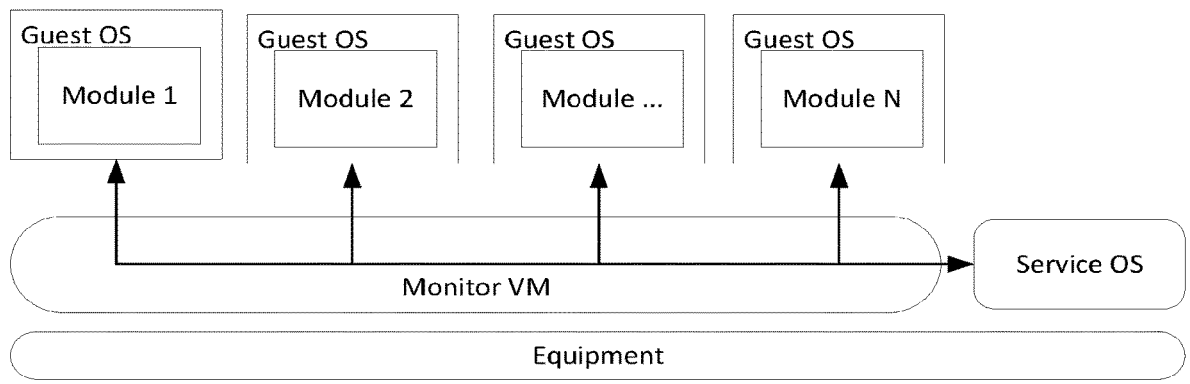

In step 220, the previously created program modules may be isolated from each other, from the operating system, and from the equipment by the security module using, for example virtualization techniques employing containers or virtual machines. When using containers (see FIG. 4*a*), the module is placed in the container, while the controlling service through which the modules interact with each other and with the operating system is installed in the operating system; examples of such services are the Docker services (Docker engine). When using virtual machines, the modules are placed in the virtual machines with different variants for the monitors of the virtual machines, which are: hypervisors of type I (see FIG. 4*b*), such as VMware ESX; hypervisors of type II (see FIG. 4*c*), Microsoft Virtual PC, VM Workstation, QEMU, Parallels, VirtualBox; hybrid hypervisors (see FIG. 4*d*), Xen, Citrix XenServer, Microsoft Hyper-V.

It should be mentioned, in addition, that one can use for the isolation in a particular instance: partitions of the PikeOS (or other types of secure OS); containerization by Linux means (Linux Containers, LXC). In one exemplary aspect, not all the modules will be isolated, and their interaction with the operating system and the other modules remains unchanged; this is illustrated by the example of module N in the figures, for which an isolation is optional.

Figure 5A:
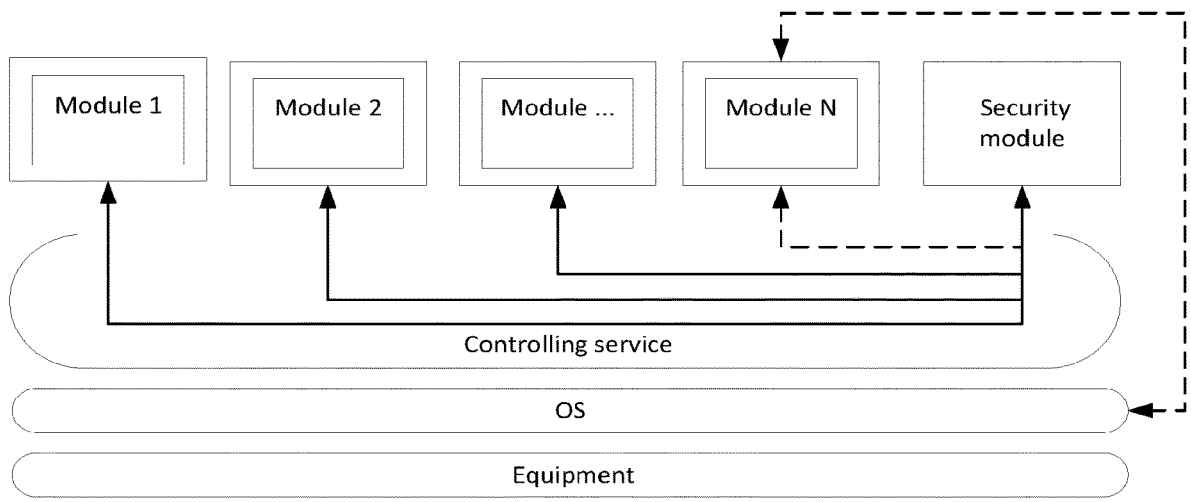
FIGS. 5A, 5B, 5C illustrate examples of the installation of the security module on the PLC.
Figure 5B:
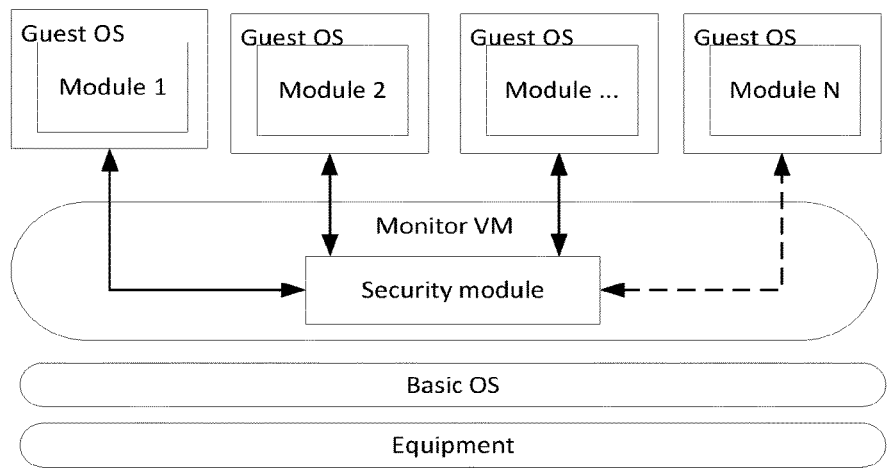
Figure 5C:
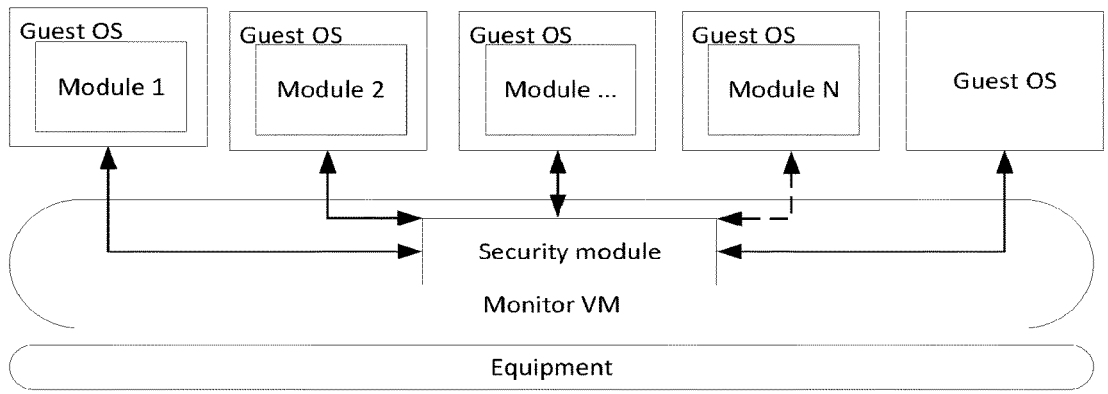

It should be noted that the security module may be installed on the PLC. In one exemplary aspect, the security module may contain functionally complete sets of code and data segments responsible for the realization of the security functions (how these functions are realized will be described below). The level of the PLC architecture on which the security module will function will be dictated by the technology used for the isolation of the modules of the PLC execution system. For example, if containers were used for the isolation (FIG. 4*a*), and a controlling service (such as Docker) was installed in the PLC OS, the security module will be placed on the same level as the containers (see FIG. 5*a*). If virtual machines are used for the isolation (see FIG. 4*b*, FIG. 4*c*, FIG. 4*d*), the security module is installed on the level of the monitor of the virtual machines (the hypervisor) or embedded therein (see FIG. 5*b*, FIG. 5*c*). In this same step, the data exchange interface of the isolated modules used for the interaction with other modules and with the resources of the operating system under the conditions of the isolation is modified such that this interaction occurs under the conditions of isolation of the modules solely through the security module, while the format of the exchanged data complies with the format dictated by the security module.

As a result, the security module is able to carry out the security functions, namely, provide monitoring for the execution of the execution system, involving: monitoring of the interaction of the isolated modules with each other, with the resources of the PLC operating system or the equipment; correcting of this interaction, halting of the interaction. The security module provides monitoring based on rules whose format concurs with the format of the data being exchanged by the modules with each other and with the operating system. The interaction is verified by the security module for compliance with a logic rule which is stored in the security module, the rule containing a description of the allowable interaction.

The security module provides a monitoring of the interaction, where the interaction is verified for compliance with a rule; if the interaction complies with the rule, then the interaction is allowed and the data are dispatched to the recipient; if the interaction does not comply with the rule, a correction of the interaction is performed (changes are made to the data being exchanged by the recipient and the source, through the security module) or the interaction is not allowed (the interaction is halted). What needs to be done by the security module in the event of noncompliance between the interaction and the rule describing that interaction is determined either by the rule itself or by a subsidiary rule, if the module does not have a rule for the interaction taking place (dispositive regulation). For example, an allowable interaction (see FIG. 5*b*) of "module 1" with "module 2", where "module 1" is the source and "module 2" is the recipient, is described by a primary "rule A" and an optional "rule B"; the security module also contains a subsidiary "rule X", which needs to be used in the event that no other rule contains any instructions for the interaction that has arisen. During the monitoring of said interaction, the security module has discovered that the interaction of "module 1" with "module 2" does not comply with "rule A". "Rule A" in such a case prescribes verifying the interaction for compliance with "rule B". The security module therefore verifies the interaction for compliance with "rule B", the module discovers that the interaction also does not comply with "rule B", but for this instance "rule B" does not prescribe anything, and so the security module applies a certain "rule X", which calls for a halting of the interaction, for example.

A more detailed example of rules for the verification of the interaction between modules is provided next: for example, the PLC comprises a communication module and a core module. The communication module may be responsible for interaction with a human machine interface (HMI). The core module may be responsible for running PLC program and sending commands to actual equipment. There is an interface between the communication module and the core module, which supports a set of commands like "PLC Program Update", "Read Audit Log", "Download File", "Stop PLC Program", etc. The security module controls every command sent from the communication to the core module. For example, the security module may implements a following rule: a) there is a set of "modes of operation" (such as "Normal Operation", "Maintenance", "Audit"); b) every mode is associated with a list of permitted commands; for example "Normal Operation" has command "Read PLC Status", but has no command "PLC Program Update"; c) only one mode is active at a given moment; d) therefore, a command is only permitted by the rule if the current mode has this command.

The present invention may also be used to detect anomalies in the execution of a PLC execution system. If anomalies are detected, it is not necessary to isolate the modules, and isolation can be used in a particular case by the methods described above. After the division of modules is performed, a security module is installed on the PLC and the module's data exchange interface is modified to interface the modules with each other and with the resources of the operating system in such a way that the specified interaction is carried out only through the installed security module and the format of the data exchanged corresponds to the format, defined by the security module. Thus, the structure of messages exchanged in whole or in part is known to the security module, this structure (data format, sometimes also called an interface) is described, for example, using Interface Definition Language (IDL) and the security module, as a result, is able to verify that the transmitted message corresponds to this description, and can also use the individual fields of this message for purposes of accessibility control.

Next, the interaction of the modules of the PLC execution system with each other and with the resources of the operating system is monitored by checking by the security module at least one interaction for compliance with the rules established for this interaction. The messages exchanged between the modules and the system are checked by the security module, because, as indicated above, the structure of the messages exchanged and on which the interaction is built in particular is known to the security module.

In the monitoring process, anomalies are detected in the performance of the PLC execution system based on the interaction mismatch detected by the security module based on the violation of interaction rules that specify normal or permitted variants of interactions. In other case, anomalies in the performance of the PLC execution system are detected based on the correspondence of the interaction detected by the security module to rules specifying abnormal or forbidden variants of interactions.

Figure 6:
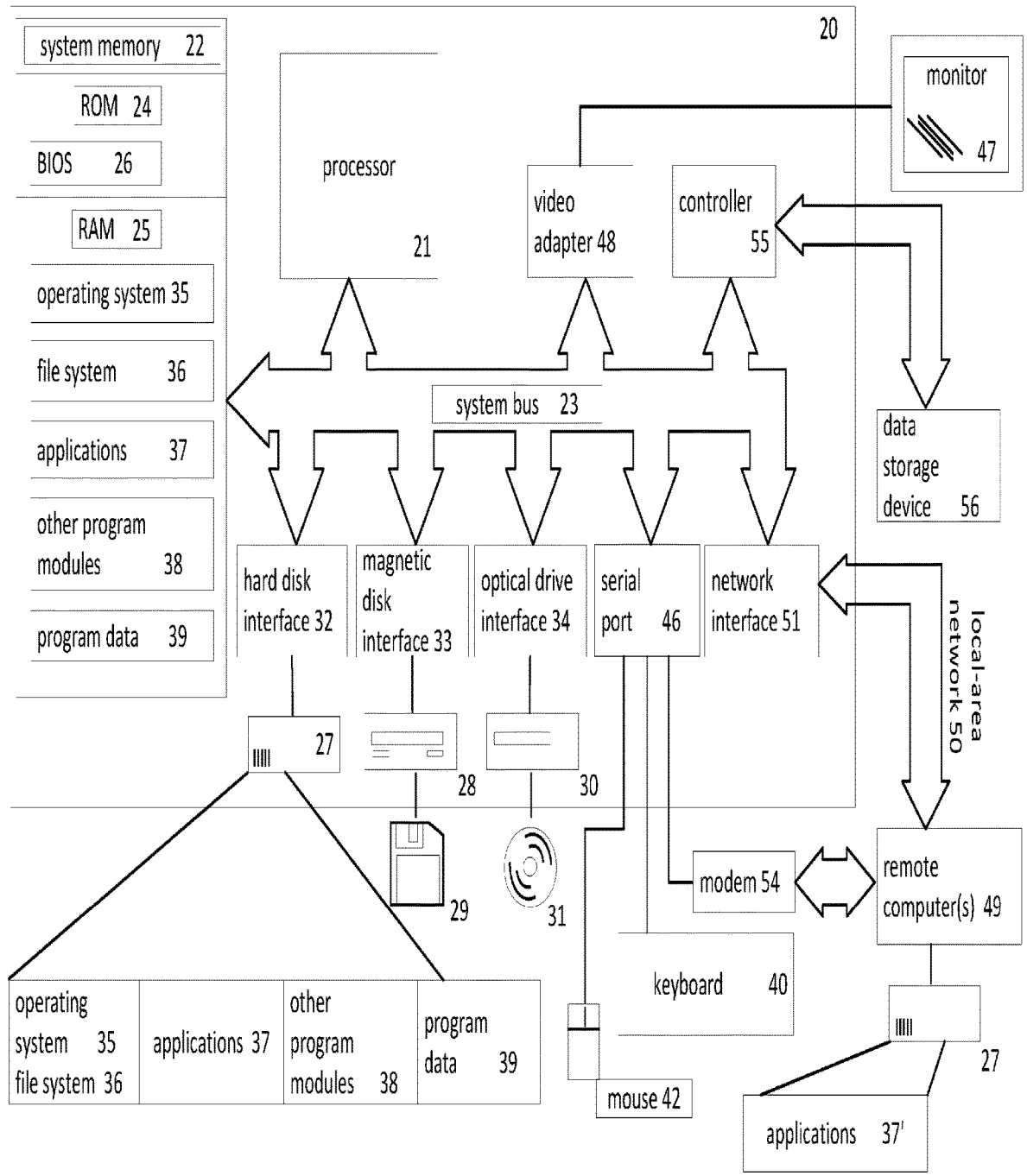
FIG. 6 illustrates an example of a general-purpose computer system on which the systems and method disclosed herein can be implemented.

FIG. 6 is a diagram illustrating an example computer system on which aspects of systems and methods for monitoring the PLC execution system may be implemented in accordance with an exemplary aspect of the invention. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, as well as those based on neuromorphic chips (neurosynaptic chips), which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for enabling data to be transmitted between program modules based on compliance with rules, the method comprising:
    monitoring, by a security module executable by a processor, an interaction between a first program module and a second program module to determine whether the interaction complies with at least one rule, wherein the first program module is a source of data being exchanged with the second program module which is a recipient of the data, wherein the first program module and the second program module are segregated to include, respectively, a first code and data segment and a second code and data segment, wherein the segregation is based on at least one of:
    the first code and data segment being for an execution of a first function and the second code and data segment being for an execution of a different second function,
    the first code and data segment and the second code and data segment having different vulnerabilities,
    the first code and data segment and the second code and data segment having different criticality for an execution system of a Programming Logic Controller (PLC);
    when the interaction does not comply with the at least one rule, modifying the data being exchanged between the source and the recipient of the data, wherein the modification changes a format of the data being exchanged to a format defined by the security module, the format specifying, in an interface definition language selected by the security module, structures of messages being exchanged for the interaction between the first program module and the second program module and fields of the messages; and
    when the interaction complies with the at least one rule, allowing the data to be transmitted to the recipient.

2. The method of claim 1, wherein the at least one rule comprises one or more of: a primary rule, an optional rule, and a subsidiary rule.

3. The method of claim 2, wherein the primary rule is used for all interactions, the optional rule is used when the primary rule evokes verification of compliance with the optional rule, and the subsidiary rule is used when neither the primary rule nor the optional rule are applicable.

4. The method of claim 3, wherein the subsidiary rule comprises: a rule for halting the interaction between the source and recipient program modules.

5. The method of claim 1, the first program module comprises a communication module responsible for an interaction with a human-machine interface, the second program module comprises a core module responsible for running the Programming Logic Controller (PLC) program that sends commands to physical equipment, an interface is provided such that the interface supports a set of commands being transmitted between the first program module and the second program module, and the security module controls every command sent from the first program module to the second program module.

6. The method of claim 5, wherein the control of commands sent from the first program module to the second program module is performed in accordance with a set of modes of operation, with each mode of operation of the set of modes of operation being associated with a respective list of permitted commands, and wherein the set of modes of operation include at least one of: a Normal Operation mode, a Maintenance mode, and an Audit mode.

7. The method of claim 6, wherein the set of commands for a given mode of operation comprises at least one of: a Read Audit Log command, a Download File command, a Stop PLC Program command, and a PLC Program Update command.

8. A system for enabling data to be transmitted between program modules based on compliance with rules, the system comprising:
    a hardware processor executing a security module configured to:
        monitor an interaction between a first program module and a second program module to determine whether the interaction complies with at least one rule, wherein the first program module is a source of data being exchanged with the second program module which is a recipient of the data, wherein the first program module and the second program module are segregated to include, respectively, a first code and data segment and a second code and data segment, wherein the segregation is based on at least one of:
        the first code and data segment being for an execution of a first function and the second code and data segment being for an execution of a different second function,
        the first code and data segment and the second code and data segment having different vulnerabilities,
        the first code and data segment and the second code and data segment having different criticality for an execution system of a Programming Logic Controller (PLC);
        when the interaction does not comply with the at least one rule, modify the data being exchanged between the source and the recipient of the data, wherein the modification changes a format of the data being exchanged to a format defined by the security module, the format specifying, in an interface definition language selected by the security module, structures of messages being exchanged for the interaction between the first program module and the second program module and fields of the messages; and when the interaction complies with the at least one rule, allow the data to be transmitted to the recipient.

9. The system of claim 8, wherein the at least one rule comprises one or more of: a primary rule, an optional rule, and a subsidiary rule.

10. The system of claim 9, wherein the primary rule is used for all interactions, the optional rule is used when the primary rule evokes verification of compliance with the optional rule, and the subsidiary rule is used when neither the primary rule nor the optional rule are applicable.

11. The system of claim 10, wherein the subsidiary rule comprises: a rule for halting the interaction between the source and recipient program modules.

12. The system of claim 8, the first program module comprises a communication module responsible for an interaction with a human-machine interface, the second program module comprises a core module responsible for running the Programming Logic Controller (PLC) program that sends commands to physical equipment, an interface is provided such that the interface supports a set of commands being transmitted between the first program module and the second program module, and the security module controls every command sent from the first program module to the second program module.

13. The system of claim 12, wherein the control of commands sent from the first program module to the second program module is performed in accordance with a set of modes of operation, with each mode of operation of the set of modes of operation being associated with a respective list of permitted commands, and wherein the set of modes of operation include at least one of: a Normal Operation mode, a Maintenance mode, and an Audit mode.

14. The system of claim 13, wherein the set of commands for a given mode of operation comprises at least one of: a Read Audit Log command, a Download File command, a Stop PLC Program command, and a PLC Program Update command.

15. A non-transitory computer readable medium storing thereon computer executable instructions for enabling data to be transmitted between program modules based on compliance with rules, including instructions for:

monitoring, by a security module executable by a processor, an interaction between a first program module and a second program module to determine whether the interaction complies with at least one rule, wherein the first program module is a source of data being exchanged with the second program module which is a recipient of the data, wherein the first program module and the second program module are segregated to include, respectively, a first code and data segment and a second code and data segment, wherein the segregation is based on at least one of:

the first code and data segment being for an execution of a first function and the second code and data segment being for an execution of a different second function, the first code and data segment and the second code and data segment having different vulnerabilities, the first code and data segment and the second code and data segment having different criticality for an execution system of a Programming Logic Controller (PLC);

when the interaction does not comply with the at least one rule, modifying the data being exchanged between the source and the recipient of the data, wherein the modification changes a format of the data being exchanged to a format defined by the security module, the format specifying, in an interface definition language selected by the security module, structures of messages being exchanged for the interaction between the first program module and the second program module and fields of the messages; and when the interaction complies with the at least one rule, allowing the data to be transmitted to the recipient.

16. The non-transitory computer readable medium of claim 15, wherein the at least one rule comprises one or more of: a primary rule, an optional rule, and a subsidiary rule.

17. The non-transitory computer readable medium of claim 16, wherein the primary rule is used for all interactions, the optional rule is used when the primary rule evokes verification of compliance with the optional rule, and the subsidiary rule is used when neither the primary rule nor the optional rule are applicable.

18. The non-transitory computer readable medium of claim 17, wherein the subsidiary rule comprises: a rule for halting the interaction between the source and recipient program modules.

19. The non-transitory computer readable medium of claim 15, the first program module comprises a communication module responsible for an interaction with a human-machine interface, the second program module comprises a core module responsible for running the Programming Logic Controller (PLC) program that sends commands to physical equipment, an interface is provided such that the interface supports a set of commands being transmitted between the first program module and the second program module, and the security module controls every command sent from the first program module to the second program module.

20. The non-transitory computer readable medium of claim 19, wherein the control of commands sent from the first program module to the second program module is performed in accordance with a set of modes of operation, with each mode of operation of the set of modes of operation being associated with a respective list of permitted commands, and wherein the set of modes of operation include at least one of: a Normal Operation mode, a Maintenance mode, and an Audit mode.

21. The non-transitory computer readable medium of claim 20, wherein the set of commands for a given mode of operation comprises at least one of: a Read Audit Log command, a Download File command, a Stop PLC Program command, and a PLC Program Update command.

* * * * *